April 21, 1959 E. F. RIESING ET AL 2,883,224
FLUID SEAL
Filed Jan. 3, 1955

INVENTORS
Ellwood F. Riesing
Cletus L. Moorman
BY
Their Attorney

United States Patent Office 2,883,224
Patented Apr. 21, 1959

2,883,224

FLUID SEAL

Ellwood F. Riesing, Dayton, and Cletus L. Moorman, Trotwood, Ohio, assignors to General Motors Corporation, Detroit, Mich., a corporation of Delaware Application January 3, 1955, Serial No. 479,368

2 Claims. (Cl. 288—2)

This invention relates to fluid seals and is particularly concerned with fluid seals of the radial type.

It is an object of this invention to provide an annular fluid seal which may be readily inserted between surfaces to be sealed and which may be inserted with either side of the seal as the leading side.

It is a further object of this invention to provide an annular fluid seal comprising a seal body having radially projecting sealing surfaces, said body having a frusto-conical reinforcing member embedded therein and positioned so that one edge thereof is disposed adjacent one side of the seal body and the other side thereof is disposed adjacent the other side of the seal body.

Yet another object of this invention is to provide an annular fluid seal which is particularly adapted to be inserted between surfaces to be sealed, one of which may be cylindrical and the other generally conical and which has radially projecting ribs engaging the cylindrical surface to be sealed and two radially projecting annular and diverging lips engaging the generally conical surface to be sealed and which further has embedded therein a frusto-conical perforated ring so that one edge of the ring is positioned adjacent one radial side thereof while the other edge of the ring is positioned adjacent the other radial side thereof.

The present seal may be applied to sealing relatively rotating surfaces such as a rotating shaft and a cylindrical housing within which the shaft rotates. It may be inserted in place without regard to whether one side or the other is the leading side thus avoiding the possibility of the seal being improperly inserted. It may also be used with particular effectiveness to seal relatively non-rotating surfaces, such as a rotating shaft and the inner race of a bearing. A specific example of such an advantageous application of the present invention is its use as a replacement of a conventional O type ring. The present ring is superior to the O ring in that it does not require grooves to be provided in the surfaces to be sealed as is usually necessary with the O ring. Further the seal is readily inserted in place between the surfaces to be sealed and does not tend to crawl or twist or become distorted during insertion and/or operation as does the O ring. The construction of the present invention has particular advantage in that it involves a relatively simple structure which may be simply and economically molded.

Further objects and advantages of the present invention will be apparent from the following description, reference being had to the accompanying drawings wherein a preferred embodiment of the present invention is clearly shown.

In brief the present invention involves a fluid seal adapted to be interposed between two members to be sealed. The seal includes an annular elastomeric body member having a generally rectangular cross-section which has embedded therein a frusto-conical ring. The ring is positioned so that one edge is disposed adjacent one radial side of the seal body and the other edge thereof is positioned adjacent the other radial side of the seal body. One of the axial sides of the seal body may be adapted to compressibly engage one of the surfaces to be sealed and to that end may be provided with one or more continuous radially projecting proturbances. The other axial side of the seal body may be provided with radially projecting, outwardly diverging, angularly shaped, sealing lips.

Figure 2:
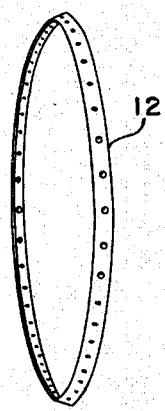
Figure 2 is a view in perspective of a perforated frusto-conical reinforcing ring.
Figure 1:
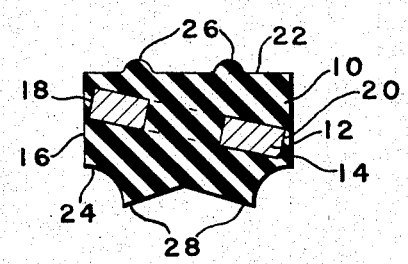
Figure 1 is a cross-sectional view of one embodiment of this invention.

Referring now to Figure 1 a seal body 10 of generally rectangular cross-section made of an elastomeric material has embedded therein a metal perforated frusto-conical ring 12 which is shown in perspective in Figure 2.

Ring 12 is made frusto-conical so that when embedded in the seal body 10 it reinforces both radial sides 14 and 16 so that either side may lead into the space to be sealed on insertion without danger of distortion of the seal body. Further the use of a frusto-conical ring greatly simplifies the operation by which the seal body is molded. Thus the mold (not shown) may consist merely of a mold cavity of a desired configuration having a central core. The frusto-conical member is placed about the said core so that it is supported by the mold bottom, the mold cavity is sealed by a cover (not shown) and elastomeric material is injected or otherwise inserted into the mold cavity. During the molding process the edges 18 and 20 of the frusto-conical ring are substantially covered by an elastomer flash although they engage the mold top and bottom with the result that a sealed body having a reinforcing ring firmly embedded therein is formed. The ring 12 is perforated so that the elastomeric material flows through the perforations during the molding process and forms a unitary body about the ring.

The seal body 10 has disposed on the outer axial surface 22 two concentric radial ribs or proturbances 26. The ribs 26 are adapted to compressibly engage one surface to be sealed and to that end may be disposed on the inner axial surface 24 of the seal body so that either of said axial sides may be adapted to compressibly engage the surface to be sealed.

The seal body 10 has disposed on its inner axial side 24 two concentric angularly shaped diverging sealing lips or ribs 28. Of course lip 28 may be disposed on the outer axial side 22 if the ribs 26 are disposed on the inner axial side 24. As will be seen sealing lip 28 may be used to engage a relatively rotating member with a wiping action or compressibly engage a substantially relatively non-rotatable surface to be sealed.

Figure 3:
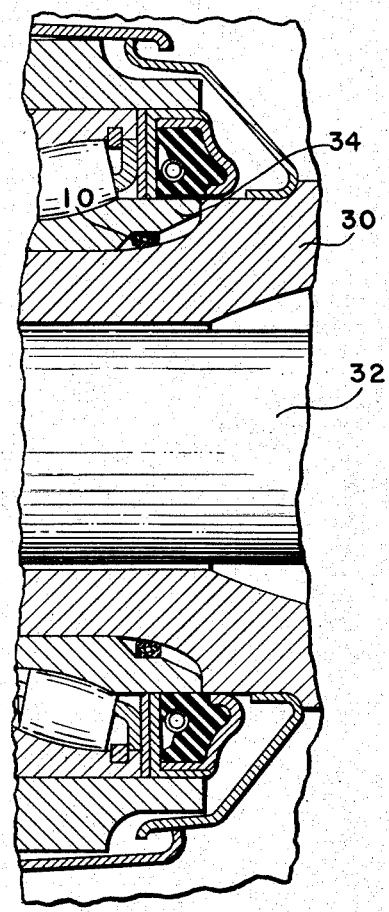
Figure 3 is a sectional fragmentary view of the seal shown in Figure 1 applied between an inner bearing race and a sleeve.

As shown in Figure 3 the invention is particularly applicable to sealing a generally conical or curved surface and another surface which surfaces must be moved longitudinally relative to each other during assembly. A shaft 32 carries thereon a sleeve 30. An inner bearing race 34, carrying internally the seal 10, is forcibly inserted over sleeve 30. As shown more clearly in Figure 4, the sleeve 30 has a generally conical surface 36 in the area to be sealed while the inner bearing race 34 is provided with a shoulder 38 which defines a cylindrical surface and compressibly receives the seal 10. The ribs 26 are readily compressible and cause a tight engagement of the seal 10 and bearing race 34 without appreciably distorting the seal body 10. As the bearing race 34 carrying the seal 10 is pressed over the sleeve 30 the leading sealing lip 28 is compressed due to the gradually increasing diameter of sleeve 30 while the following sealing lip 28 is compressed to a lesser extent thereby providing a dual sealing effect. The angular diverging shape of the sealing lips 28 causes them to compress radially rather than distort axially. It should be obvious that the present seal is inserted in a mechanism such as shown in Figure 3 evenly and simply and without danger of distorting or "corking" the seal as would be the case of conventional O rings.

Figure 4:
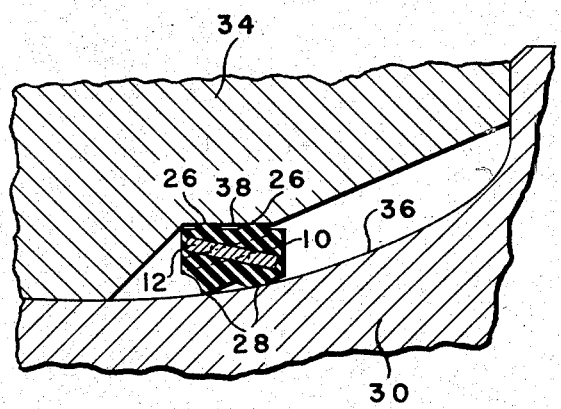
Figure 4 is an enlarged fragmentary cross-sectional view showing in greater detail the position of the seal shown in Figure 3 between the parts to be sealed.

It is to be understood that the expression "generally conical surface" used throughout this specification includes surfaces having a concave curvature as shown in Figure 4 and a convex curvature as well as a cone having a straight surface.

Although one embodiment of this invention has been shown as applied to receiving non-rotatable surfaces to be sealed it should be obvious that the seal may be utilized to seal relatively rotating or reciprocating surfaces. In such an application the seal would be inserted between surfaces to be sealed in such a manner that the sealing lips 28 would both be in light wiping engagement with the rotating or one of the reciprocating surfaces.

The term "elastomer" embraces any suitably compounded mixtures of rubbery materials, for example, natural rubber, butadiene styrene copolymers, butadiene acrylonitrile copolymers, polychloroprene, compatible mixtures of any of the above together with other useful natural and synthetic materials having similar characteristics.

While the embodiment of the present invention as herein disclosed, constitutes a preferred form, it is to be understood that other forms might be adopted.

What is claimed is as follows:

1. For attaining a dual sealing effect between dissimilar surfaces, cooperating means, comprising, first and second substantially annular members having radially spaced surfaces relative to which fluid sealing is necessary, a generally conical surface provided on said first annular member, a cylindrical surface on said second annular member located in radial alignment and spaced from said generally conical surface of said first annular member, a fluid seal adapted to be free of danger of distorting as well as "corking" and including an annular elastomeric body having a generally rectangular cross-section, a pair of spaced coaxially positioned angularly-shaped and diverging sealing lips extending integrally and radially of said annular elastomeric body and engaged against said generally conical surface of said first annular member, two spaced coaxially positioned ribs extending in a direction radially opposite to said angularly shaped lips, said annular elastomeric body having a pair of radial sides, said ribs being engaged with said cylindrical surface of said second annular member, and a metal perforated frusto-conical ring having opposite annular edges immediately adjacent to said radial sides of said annular elastomeric body and embedded therein, said angularly-shaped lips being adapted to compress radially rather than distort axially relative to said generally conical surface of said first annular member thereby obviating distorting and "corking" of said seal which would be dislocated between said cylindrical surface and said generally conical surface.

2. Means in accordance with claim 1 wherein said metal perforated ring has opposite annular edges covered only by elastomeric flash as elastomeric material flows through perforations and forms said elastomeric body in a unitary annular shape on opposite sides of said ring, one of said lips being radially in alignment with one of said ribs and another of said lips being radially in alignment with another of said ribs to enable said sealing means to be inserted between said cylindrical surface and said generally conical surface axially in either direction, yet adapted to provide a dual sealing effect between said cylindrical surface and said generally conical surface.

References Cited in the file of this patent

UNITED STATES PATENTS

| | | |
|---|---|---|
| 2,417,390 | Winkeljohn | Mar. 11, 1947 |
| 2,697,623 | Mosher | Dec. 21, 1954 |
| 2,727,769 | Kayser | Dec. 20, 1955 |
| 2,736,585 | Riesing | Feb. 28, 1956 |

FOREIGN PATENTS

| | | |
|---|---|---|
| 112,747 | Sweden | Dec. 19, 1944 |
| 591,698 | Great Britain | Aug. 26, 1947 |